Figure 1:
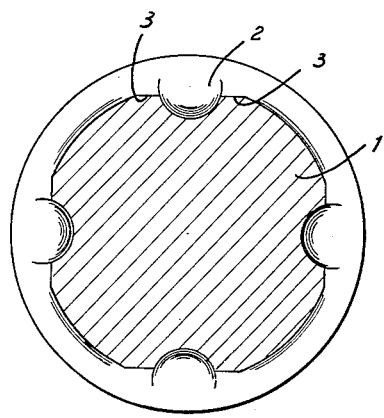

July 3, 1962 E. ZUMBRUNNEN 3,041,887
DRIVE SHEAVE
Filed Sept. 15, 1959

INVENTOR.
ERHARD ZUMBRUNNEN
BY
*Mestern & Kollin*
ATTORNEYS 3,041,887
DRIVE SHEAVE
Erhard Zumbrunnen, Magliaso, Lugano, Switzerland, assignor to Viso S.A., Magliaso, Lugano, Switzerland
Filed Sept. 15, 1959, Ser. No. 840,039
Claims priority, application Switzerland Sept. 16, 1958
4 Claims. (Cl. 74—229)

Swiss Patent No. 339,373 describes a drive cord consisting of a continuous endless wire or transmission belt of synthetic material or metal, provided at periodic intervals with thickenings or enlargements engaging matching depressions arranged in the groove of a drive sheave. The line joining the several depressions on the sheaves describes an arc of the same radius as the sheave.

The line joining the centers of the thickenings present at periodic intervals on the drive cord, on the other hand, is straight.

The result of this difference in form between the line joining the depressions on the sheave and that joining the thickenings on the belt is a continual sharp kinking stress, since the belt, in passing over the sheave, must adapt itself to the shape of the latter, at the points where the cord emerges from the thickenings. The cord suffers rapid fatigue and gives way, largely because it naturally has little flexibility at the points of emergence from the thickenings.

It has now been found that the durability of drive cords having periodic thickenings engaging matching depressions in sheaves can be substantially improved if the portions of the bearing surface adjoining the depressions have a straight-line profile perpendicular to the sheave radius passing through the center of the depression. The length of each straight portion may advantageously be about equal to the diameter of the cord.

The device according to the invention will now be more fully described with reference to the accompanying drawing, but it should be understood that this is given by way of illustration and not of limitation and that many changes in the details may be made without departing from the spirit of the invention.

Figure 2:
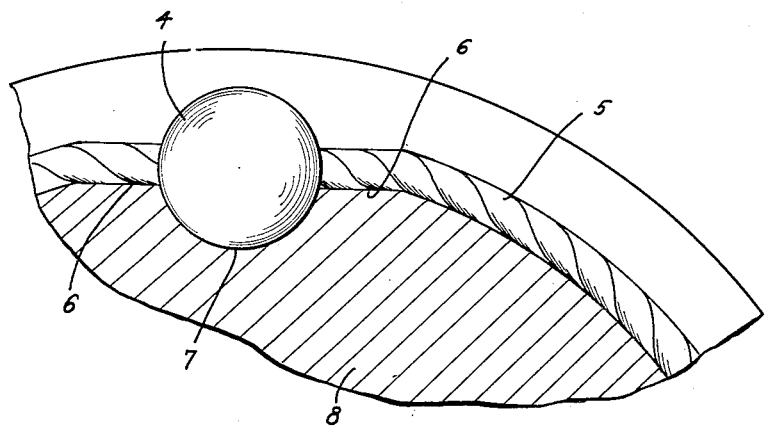

In the drawings:

FIG. 1 shows a view of a sheave according to the invention, the flange on the side towards the observer having been omitted; and FIG. 2 shows the condition of the drive cord in the immediate vicinity of a depression in the sheave.

The sheave in FIG. 1 consists of a grooved wheel 1 having four spherical depressions 2 equally spaced along the groove. The portions 3, adjoining the depressions 2, of the line of contact of the drive cord do not have the circular form of the wheel but are straight-line segments, each two segments adjoining a depression being perpendicular to the sheave radius through the center of the depression.

In FIG. 2, the seating of a single spherical thickening 4 corresponding to the diameter of the depressions on drive cord 5 and of the drive cord 5 itself in the vicinity 6 of a depression 7 on sheave 8 is shown. It will be seen that the drive cord does not tend to be sharply bent at its points of emergence from the offset forming enlargements 4 upon a sheave constructed according to the invention, but makes a gradual transition to the circular shape of the sheave as it passes over the pair of rectilinear groove portions 3 flanking each depression 7.

What I claim is:
1. The combination, with a transmission belt comprising a cord with equispaced spherical offsets thereon, of a drive sheave engageable by said belt and provided with equispaced peripheral depressions of general hemispherical configuration closely conforming to said offsets, the peripheral of said sheave being further provided with pairs of cord-supporting rectilinear portions extending in circumferential direction on opposite sides of respective depressions, each pair of rectilinear portions being perpendicular to the sheave radius which passes through the center of the depression flanked thereby and lying at a level corresponding to that of the sheave-contacting surface of said cord at the point of its emergence from an offset received in said depression.

2. The combination, with a transmission belt comprising a cord with equispaced offsets thereon, of a drive sheave engageable by said belt and provided with a peripheral groove having equispaced depressions of generally hemispherical configuration closely conforming to said offsets, said grooves being further provided with pairs of cord-supporting rectilinear portions extending in circumferential direction on opposite sides of respective depressions, each pair of rectilinear portions being perpendicular to the sheave radius which passes through the center of the depression flanked thereby and lying at a level corresponding to that of the sheave-contacting surface of said cord at the point of its emergence from an offset received in said depression.

3. The combination, with a transmission belt comprising a cord with equispaced spherical offsets thereon, of a drive sheave engageable by said belt and provided with equispaced peripheral depressions of generally hemispherical configuration closely conforming to said offsets, the periphery of said sheave being further provided with pairs of cord-supporting rectilinear portions extending in circumferential direction on opposite sides of respective depressions over a distance at least equal to the diameter of said chord, each pair of rectilinear portions being perpendicular to the sheave radius which passes through the center of the depression flanked thereby and lying at a level corresponding to that of the sheave-contacting surface of said cord at the point of its emergence from an offset received in said depression.

4. The combination, with a transmission belt comprising a cord with equispaced spherical offsets thereon, of a drive sheave engageable by said belt and provided with a peripheral groove having equispaced depressions of generally hemispherical configuration closely conforming to said offsets, said groove being further provided with pairs of cord-supporting rectilinear portions extending in circumferential direction on opposite sides of respective depressions over a distance at least equal to the diameter of said cord, each pair of rectilinear portions being perpendicular to the sheave radius which passes through the center of the depression flanked thereby and lying at a level corresponding to that of the sheave-contacting surface of said cord at the point of its emergence from an offset received in said depression.

References Cited in the file of this patent
UNITED STATES PATENTS

| | | |
|---|---|---|
| 332,672 | Mellette et al. | Dec. 15, 1885 |
| 1,666,950 | Smallwood | Apr. 24, 1928 |
| 1,704,150 | Riley | Mar. 5, 1929 |

FOREIGN PATENTS

| | | |
|---|---|---|
| 555,437 | Germany | July 22, 1932 |